US012662969B1

(12) United States Patent
Mercuri et al.

(10) Patent No.: US 12,662,969 B1
(45) Date of Patent: Jun. 23, 2026

(54) COMPRESSOR BLEED AIR SYSTEM WITH AN ACTUATOR DRIVEN BACKFLOW VALVE FOR AN AIRCRAFT ENGINE

(71) Applicant: PRATT & WHITNEY CANADA CORP., Longueuil (CA)

(72) Inventors: Jason Mercuri, Greenfield Park (CA); John Sgouromitis, Dorval (CA)

(73) Assignee: PRATT & WHITNEY CANADA CORP., Longueil (CA)

( * ) Notice: Subject to any disclaimer, the term of this patent is extended or adjusted under 35 U.S.C. 154(b) by 0 days.

(21) Appl. No.: 19/216,898

(22) Filed: May 23, 2025

(51) Int. Cl.
  *F02C 9/18* (2006.01)
  *F04D 27/00* (2006.01)

(52) U.S. Cl.
  CPC .............. *F02C 9/18* (2013.01); *F04D 27/009* (2013.01); *F05D 2220/323* (2013.01); *F05D 2260/606* (2013.01)

(58) Field of Classification Search
  None
  See application file for complete search history.

(56) References Cited

U.S. PATENT DOCUMENTS

| | | | |
|---|---|---|---|
| 3,360,189 A | * | 12/1967 | Cook .................... F01D 17/105 |
| | | | 415/144 |
| 3,909,152 A | | 9/1975 | Rannenberg |
| 4,627,789 A | | 12/1986 | Petro et al. |
| 10,626,801 B2 | | 4/2020 | Mackin et al. |
| 10,641,183 B2 | | 5/2020 | Joudareff et al. |
| 2009/0056307 A1 | * | 3/2009 | Mons ........................ F02C 9/18 |
| | | | 60/226.3 |
| 2019/0162203 A1 | * | 5/2019 | Shinde ...................... F02C 7/18 |
| 2020/0040901 A1 | * | 2/2020 | DeFelice ............. F04D 27/0223 |
| 2023/0184165 A1 | * | 6/2023 | Hicks ...................... F02C 7/047 |
| | | | 60/39.093 |

* cited by examiner

*Primary Examiner* — Phutthiwat Wongwian
*Assistant Examiner* — Jacek Lisowski
(74) *Attorney, Agent, or Firm* — NORTON ROSE FULBRIGHT CANADA LLP

(57) ABSTRACT

A system for bleeding air from a compressor of an aircraft engine, the system comprises a bleed off valve and a plenum for receiving bleed air from the compressor via the bleed off valve. The plenum has a first outlet for discharging the bleed air from the plenum into the atmosphere, and a second outlet fluidly connected to the compressor for reinjecting a portion of the bleed air into an air intake portion of the compressor. A backflow valve is provided for selectively closing the first outlet of the plenum. The backflow valve has an actuator operable to displace a closure from a closed position to an open position upon a fluid pressure inside the plenum reaching a pressure threshold.

18 Claims, 5 Drawing Sheets

1. BOV closed, plenum empty
2. BOV opens, plenum fills
3. Plenum air exits through choked piccolo holes and plenum pressure increases
4. BFV pressure threshold reached and opens, plenum pressure is maintained
5. BOV closed and remaining air flows out until back to 1

Time

COMPRESSOR BLEED AIR SYSTEM WITH AN ACTUATOR DRIVEN BACKFLOW VALVE FOR AN AIRCRAFT ENGINE

TECHNICAL FIELD

The disclosure relates generally to aircraft engines and, more particularly, to a system for selectively bleeding air from a compressor section of such engines.

BACKGROUND OF THE ART

The compressor of an aircraft engine is typically provided with a bleed air system including a plurality of compressor bleed valves, also known as bleed off valves (BOVs), which are operative to release air from the engine at the onset of an operating condition that might otherwise results in a compressor instability referred to as surge or stall. The BOVs function by allowing excess airflow to be purged from predetermined compressor stages to offboard. Flapper valves are sometimes used downstream of such bleed off valves, to prevent backflow of the bleed air and backpressure from the atmosphere. While such flapper valves may be satisfactory for their intended purposes, there is a continued need for improvements.

SUMMARY

In one aspect, there is provided a system for bleeding air from a compressor of an aircraft engine, the system comprising: a bleed off valve fluidly connected to the compressor; a plenum downstream of the bleed off valve for receiving bleed air from the compressor via the bleed off valve, the plenum having a first outlet for discharging the bleed air from the plenum into the atmosphere, and a second outlet fluidly connected to the compressor at a location upstream from the bleed off valve relative to a flow of air through the compressor; and a backflow valve having a closure for selectively closing the first outlet of the plenum, and an actuator operable to displace the closure from a closed position to an open position upon a fluid pressure inside the plenum reaching a pressure threshold.

In another aspect, there is provided an aircraft engine comprising: a compressor section fluidly connected to an air intake including a plurality of inlet struts, one or more of the inlet struts having piccolo holes; and a compressor bleed air system including: one or more bleed off valves for bleeding air from the compressor section; a plenum in fluid communication with the one or more bleed off valves for receiving compressor bleed air from the one or more bleed off valves, the plenum having a first outlet fluidly connected to the atmosphere and a second outlet fluidly connected to the piccolo holes for reinjecting a portion of the compressor bleed air received in the plenum into the air intake; and a backflow valve at the first outlet, the backflow valve including a closure displaceable between a closed position in which the first outlet of the plenum is closed and an open position in which the first outlet is opened, and an actuator configured to displace the closure from the closed position to the open position when the piccolo holes are choked.

DESCRIPTION OF THE DRAWINGS

Reference is now made to the accompanying figures in which.

DETAILED DESCRIPTION

Figure 1:
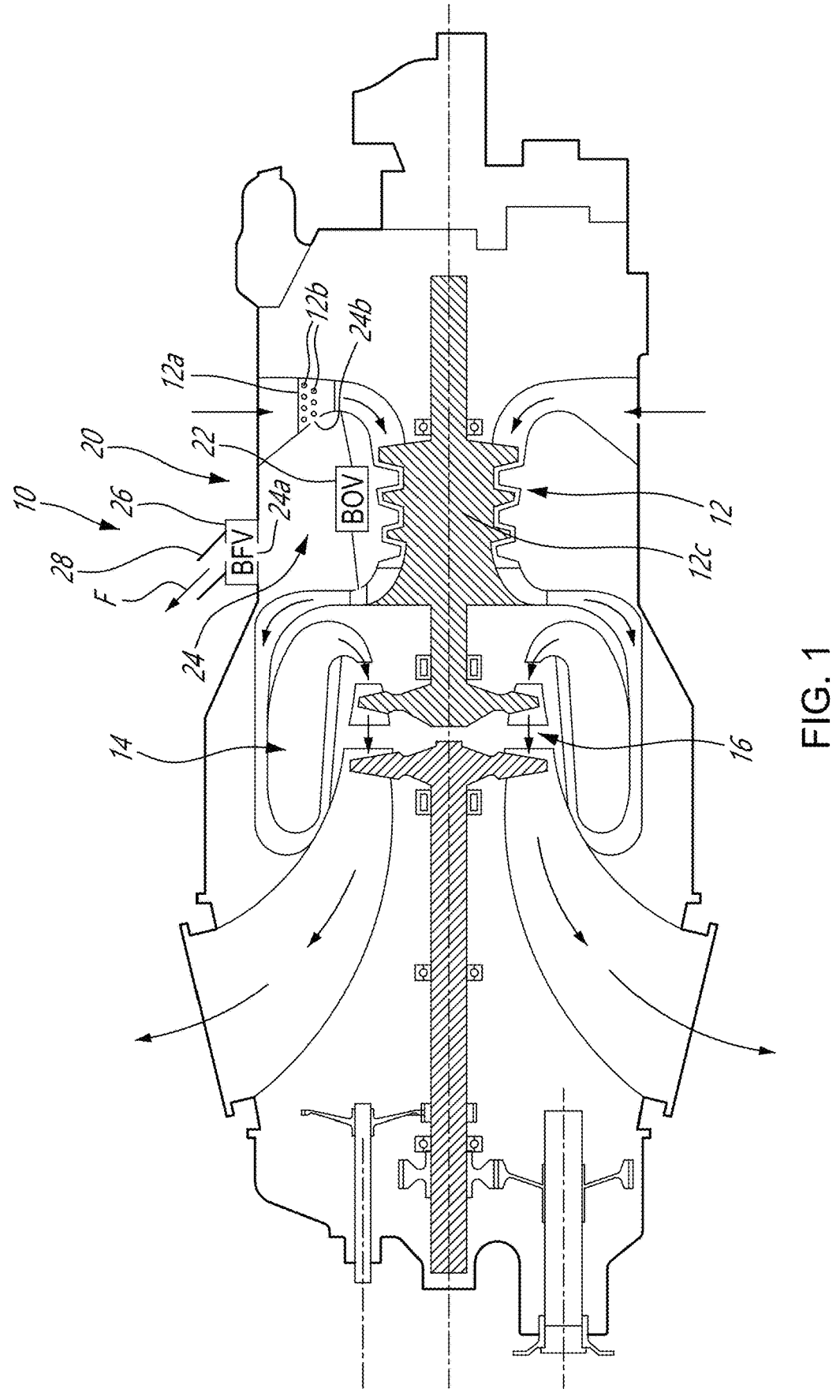
FIG. 1 is a schematic cross sectional view of a gas turbine engine embodied in the form of a turboshaft engine having a compressor bleed air system.

FIG. 1 illustrates a turboshaft engine 10 of a type suitable for use as a helicopter powerplant or as an airborne auxiliary power unit (APU), and generally comprising in serial flow communication a compressor section 12 for pressurizing ambient air, a combustor 14 in which the compressed air is mixed with fuel and ignited for generating an annular stream of hot combustion gases, and a turbine section 16 for extracting energy from the combustion gases. As schematically shown in FIG. 1, the compressor section 12 has an air intake or air inlet portion including a circumferential array of hollow inlet struts or vanes 12a. As discussed in more details below, the hollow inlet vanes 12a may have piccolo holes 12b distributed thereon for reinjecting compressor bleed air into the compressor inlet portion at a location upstream of the compressor rotor 12c. The piccolo holes 12b can advantageously be used to change the direction of the incoming air and achieve an optimized angle of attack at the face of the compressor rotor 12c while the compressor is ramping up.

The exemplary engine 10 further comprises a system 20 for selectively bleeding air from the compressor section 12. The system 20 generally comprises one or more bleed valves 22 operable to mitigate surges in the compressor stages during off-design running. The one or more bleed valves 22 may be disposed at selected compressor stages (e.g., at the P2.8 compressor stage) to selectively bleed air from the selected compressor stage(s) of the compressor section 12. The system 20 further comprises a plenum 24 fluidly connected to respective outlets of the one or more bleed valves 22. The plenum 24 has a first outlet 24a to allow the air bled from the compressor section 12 to be purged overboard to the atmosphere and one or more second outlets 24b fluidly connected to one or more of the hollow inlet vanes 12a for reinjecting a portion of the compressor bleed air into the compressor flow path via the piccolo holes 12b to create jet flap effect an aid compressor operability while the compressor is ramping up. The system 20 further comprises a backflow valve 26 operable for selectively closing the first outlet 24a. Appropriate ducting 28 is provided downstream of the backflow valve 26 for discharging the bleed air from the plenum 24 to the atmosphere. As will be seen herein after, the backflow valve 26 acts as a one-way valve that prevents or limits backflow of the bleed air once bled from the compressor section 12 via the one or more bleed valves 22. Put differently, the backflow valve 26 is a unidirectional valve that permits air to flow in one directly only, for example air bled out of the compressor section 12 of the engine 10, which is directed downstream (away from the engine core) and dumped overboard to atmosphere. The backflow valve 26 prevents back-flow from the atmosphere, such that pressurized airflow bled from the compressor section 12 can pass through the valve 26 in a flow direction F, but air outside of the aircraft engine 10 (e.g., atmospheric air) cannot flow back into the gas path of the compressor section 12 via the plenum 24 and the piccolo holes 12*b* when the one or more bleed valves 22 are closed.

The backflow valve 26 is thus used to limit back-pressure from the atmosphere, so that the bleed air (e.g., P2.8 air) extracted from the engine 10 can be effectively purged overboard. Notably, the backflow valve 26 prevents air from entering the plenum 24 at high engine power after the one or more bleed valves 22 have closed. The backflow valve 26 also serves as a physical barrier to potential foreign objects (e.g., stones, ice, sand, snow, rain, etc.) that could otherwise result in foreign object damage (FOD).

Figure 2:
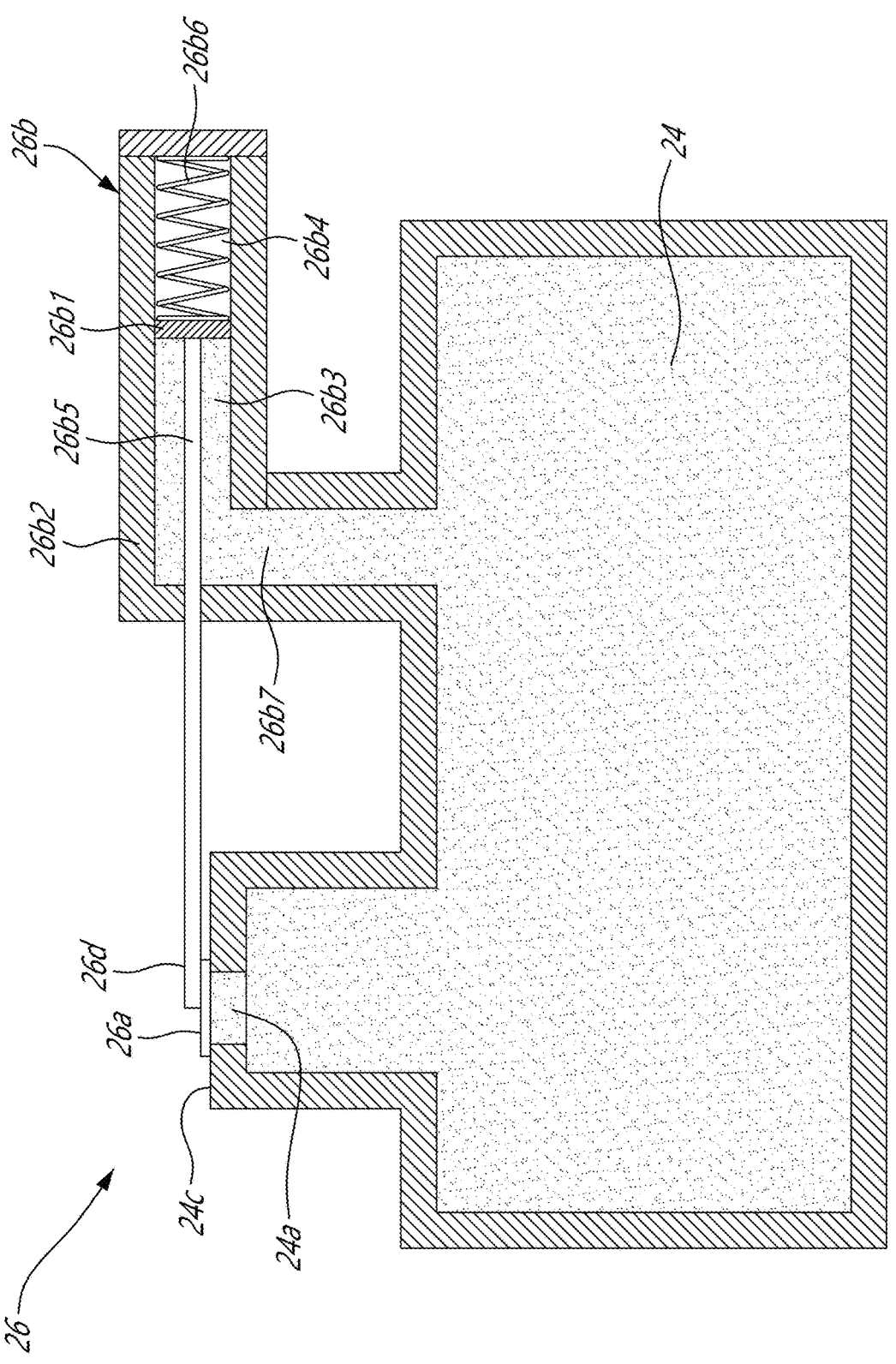
FIG. 2 is a schematic side view of a pressure driven spring piston backflow valve which can be used to selectively close an outlet of a plenum of the compressor bleed air system.
Figure 3:
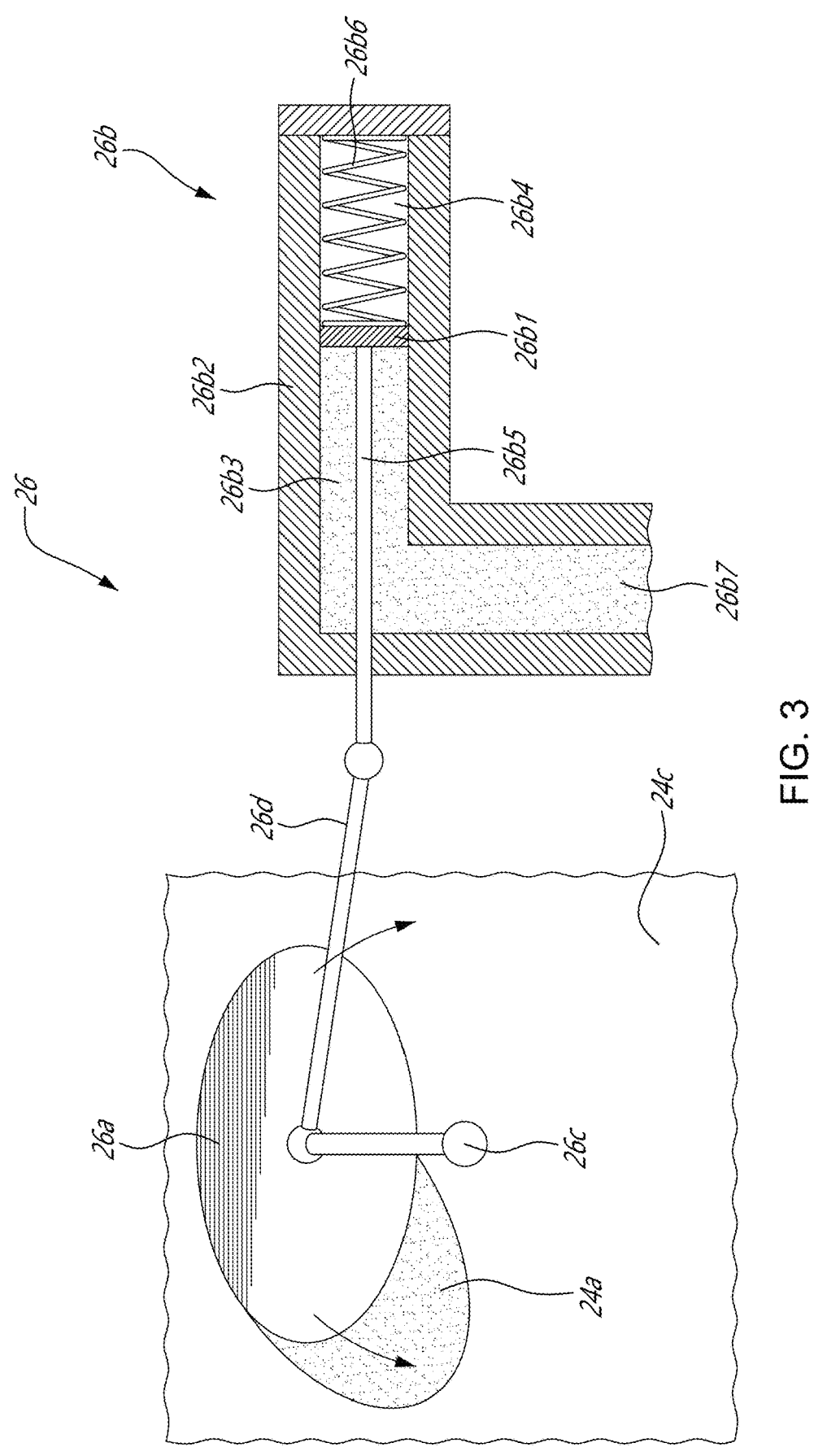
FIG. 3 is a schematic top plan view or downstream side of the pressure driven spring piston backflow valve of FIG. 2.

Referring to FIGS. 2-3, it can be appreciated that the backflow valve 26 generally comprises a closure 26*a* for selectively closing the first outlet 24*a* of the plenum 24, and an actuator 26*b* operable to displace the closure 26*a* from a closed position to an open position upon a fluid pressure inside the plenum 24 reaching a predetermined pressure threshold (Pr). The pressure threshold (Pr) corresponds to the air pressure in the plenum 24 once the max flow rate of the piccolo holes 12*b* is achieved (i.e., when the piccolo holes 12*b* are choked so that the bleed air in the plenum 24 can no longer flow through the piccolo holes 12*b*). That is the actuator 26*b* is set to automatically displace the closure 26*a* from its closed position to its open position upon the piccolo holes 12*b* receiving the maximum amount of flow they can possibly accommodate, thereby allowing the bleed air in the plenum 24 to be purged overboard via the backflow valve 26, which has a flow area greater than the total flow area of the piccolo holes 12*b*. Indeed, as the flow area of the piccolo holes 12*b* is smaller than the flow area of the backflow valve 26, once the max flow rate of the piccolo holes 12*b* is achieved and the one or more bleed valves 22 are still opened, the pressure in the plenum 24 will increase and force open the closure 26*a* of the backflow valve 26, thereby allowing excess bleed air to be dumped offboard.

Figures 5A, 5B:
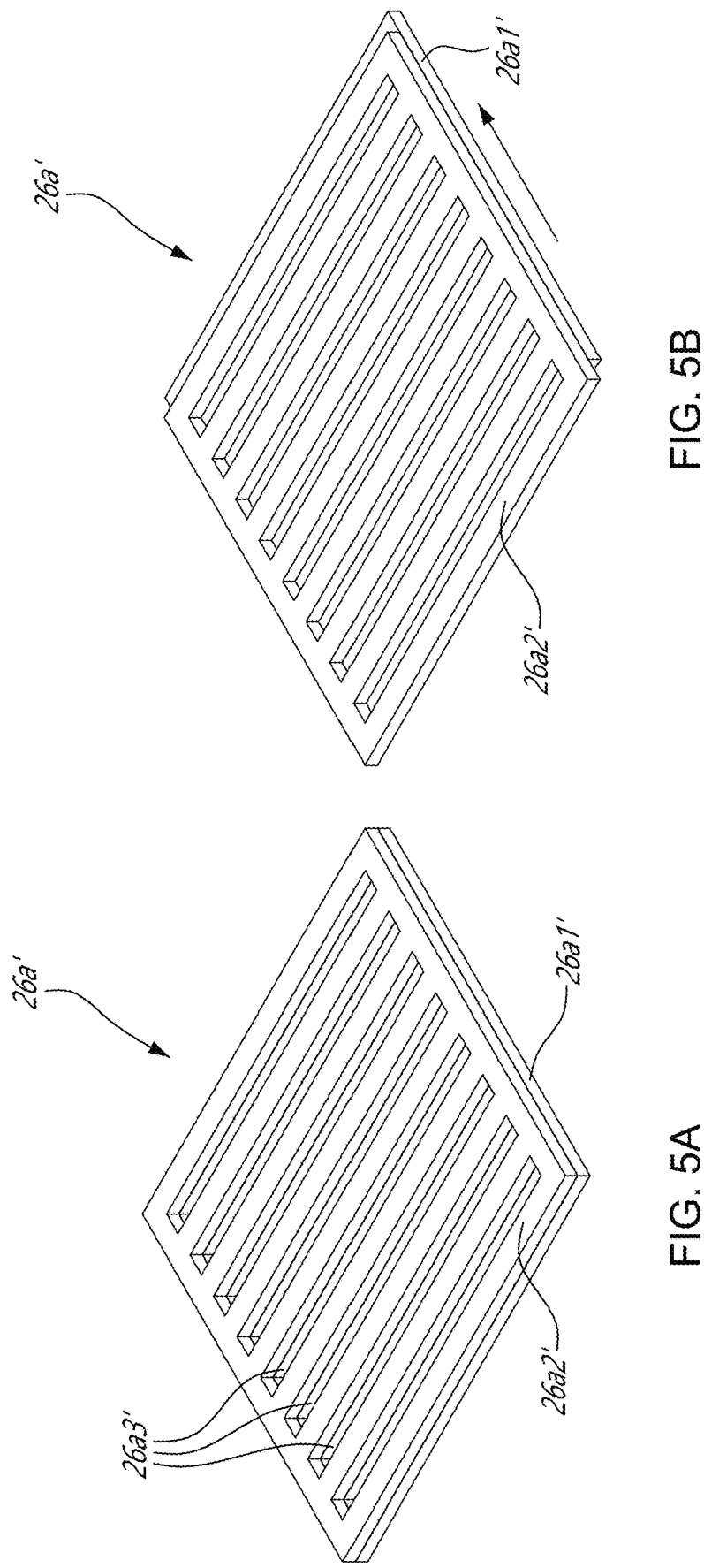
FIGS. 5a-5b schematically illustrate an embodiment of the closure of the backflow valve in an open and a closed position, the closure including a pair of grill-like members or plates linearly displaceable relative to one another.

It is understood that the closure 26*a* and the associated actuator 26*b* can take various forms. For example, referring specifically to the embodiment depicted in FIGS. 2-3, the closure 26*a* can take the form of a metering plate movable in a plane normal to the axis of the first outlet 24*a* of the plenum 24. For example, the metering plate can be mounted for sliding movement on the outer surface of a wall 24*c* of the plenum 24. Still according to the illustrated example, the metering plate is pivotable about a pivot 26*c* having a pivot axis parallel to and offset from the axis of the first outlet 24*a* of the plenum 24. As shown in FIGS. 2 and 3, the closure 26*a* (i.e., the metering plate) can be mechanically connected to the actuator 26*b* via a linkage 26*d*, the linkage connected to the metering plate at a location spaced from the pivot 26*c*. It is understood that other means could be used to operatively connect the actuator 26*b* to the closure 26*a*. For instance, a rack and pinion arrangement (not shown) could be used to operatively connect the actuator 26*b* to the closure 26*a*. In such a case, the metering plate could be mounted for linear movement (e.g., a translation) instead of pivotal movement as illustrated in FIG. 3. FIGS. 5*a*-5*b* illustrate an example of a linearly moveable closure 26*a'*. According to this embodiment, the closure is provided in the form of coplanar plates or grill-like members 26*a*1' and 26*a*2' linearly displaceable relative to one another. FIG. 5*a* illustrates the closure 26*a'* in an open position in which the air flow passages 26*a*3' of the grill-like members 26*a*1', 26*a*2' are aligned. FIG. 5*b* illustrates the closure in a closed position in which the air flow passages of the grill-like members 26*a*1', 26*a*2' are offset.

According to some embodiments, the actuator 26*b* may be provided in the form of a fluid driven actuator. For example, as shown in FIGS. 2-3, the actuator 26*b* may comprise a piston 26*b*1 mounted for reciprocating movement within a piston cylinder or housing 26*b*2. The piston 26*b*1 divides the housing 26*b*2 into a first chamber 26*b*3 and a second chamber 26*b*4. An actuator rod 26*b*5 extends axially from the piston 26*b*1 through the first chamber 26*b*3 and outwardly of a first end of the housing 26*b*2 to displace the closure 26*a* between the open and closed positions via the linkage 26*d*. A spring 26*b*6 is mounted in the second chamber 26*b*4 between the piston 26*b*1 and a second end of the housing 26*b*2 to bias or spring load the piston 26*b*1 towards the first end of the housing 26*b*2. The first end position corresponds to the closed position of the backflow valve 26. That is the backflow valve 26 is biased in its closed position by the spring 26*b*6. The first chamber 26*b*3 has a control port 26*b*7 fluidly connected to a source of fluid pressure. Accordingly, a pressurized fluid can be directed into the first chamber 26*b*3 in order to displace the piston 26*b*1 against the biasing force of the spring 26*b*6 towards the second end of the housing 26*b*2 and, thereby displace the closure 26*a* of the backflow valve 26 to its open position. According to the example illustrated in FIGS. 2 and 3, the source of fluid pressure is the bleed air inside the plenum 24 (i.e., the control port 26*b*7 and, thus, the first chamber 26*b*3 are fluidly connected to the plenum 24). However, it is understood that other sources of fluid pressure could be used (e.g., air from a compressor stage different than the compressor stage from which the air is bled, e.g. P2.5 air, P3 air, etc.). The system 20 and more specifically the spring 26*b*6 according to the illustrated example, is tuned/adjusted as a function of the fluid pressure used to operate the actuator 26*b* so that the biasing force urging the backflow valve 26 in the closed position is overcome when the piccolo holes 12*b* are choked (i.e., when the bleed air stop flowing through the piccolo holes 12*b* back into the flow path of the compressor), thereby allowing excess bleed air in the plenum 24 to be dumped offboard via the ducting 28.

The above-described embodiments thus provide a backflow valve including a pressure driven spring piston actuator normally urging a sliding metering plate in a closed position to close the first outlet 24*a*, the actuator tuned to automatically displace the metering plate to its open position when the bleed air in the plenum 24 stops flowing through the piccolo holes 12*b* (i.e., when the piccolo holes 12*b* are choked). Such a backflow valve arrangement can be advantageous over typical flapper or butterfly valve designs, which are susceptible to HCF fatigue due to their dynamic nature of fluttering open and shut repeatedly. The above-described embodiments can advantageously dampen the effect of the turbulent nature of the bleed off air and, thus, better resist high dynamic motion over time.

According to still further embodiments, the above-described pressure driven spring piston actuator could be replaced by use of a pressure sensor (not shown) linked to a servo motor (not shown). However, in all cases, the actuator is tuned/adjusted to open the backflow valve 26 when the piccolo holes 12*b* are choked.

Figure 4:
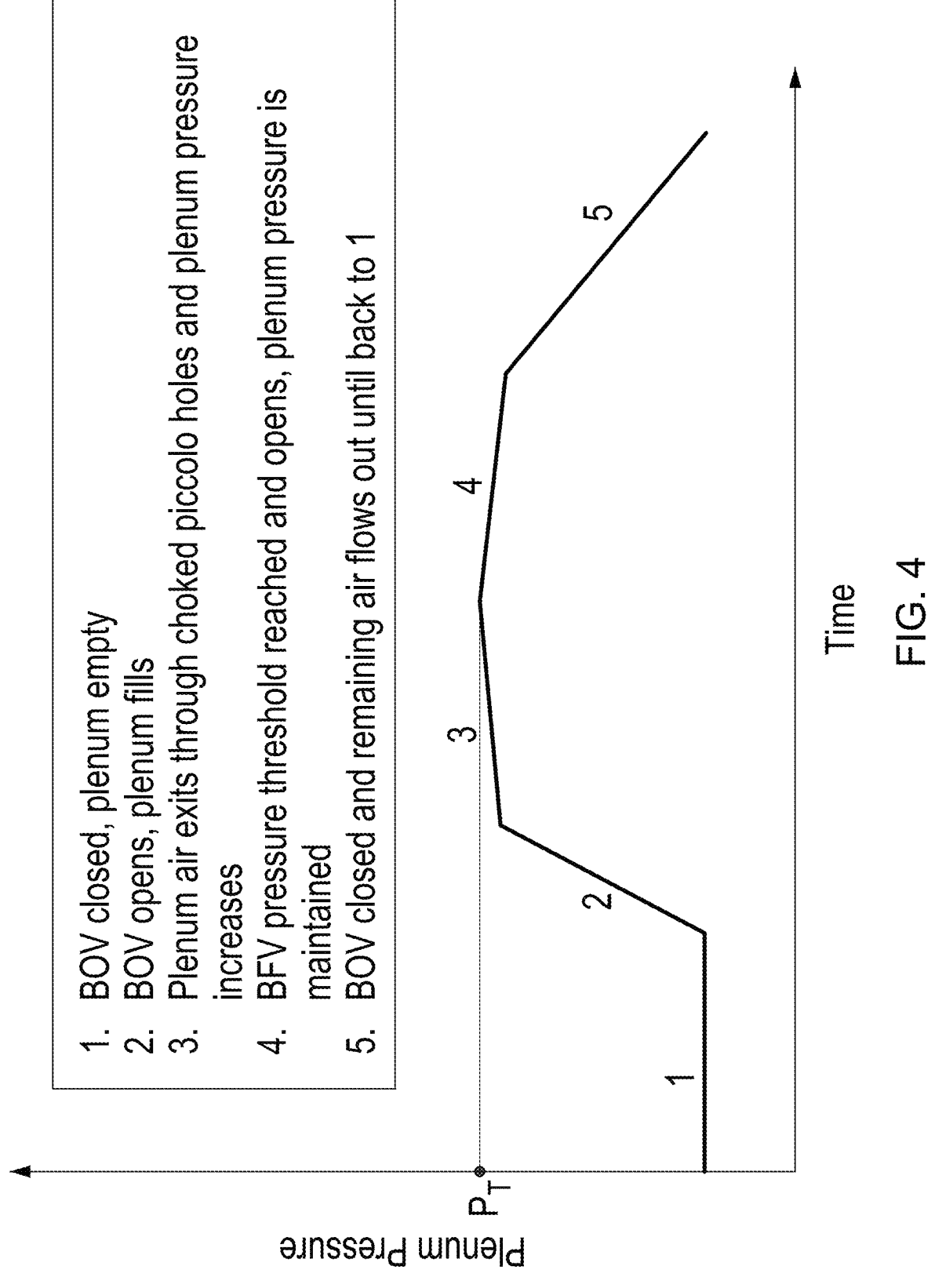
FIG. 4 is a graph of the pressure in the plenum of the compressor bleed air system over time and illustrating the operation of the system.

FIG. 4 illustrates the operation of the system 20. Initially, at engine start, the one or more bleed off valves 22 and the backflow valve 26 are closed and the plenum 24 is empty. This corresponds to stage 1 in the graph of FIG. 4. Then, during stage 2, the one or more bleed off valves 22 opens and the air pressure in the plenum 24 rises. While the compressor is ramping up, bleed air flows from the plenum 24 through the piccolo holes 12*b* and back into the compressor to pre-swirl air flow into the compressor. At one point, the piccolo holes 12*b* reach the maximum flow they can accommodate and the flow of bleed air from the plenum 24 through the piccolo holes 12*b* stops. As shown in stage 3, this causes the pressure in the plenum 24 to rise to the predetermined pressure threshold (PT). At this point, the fluid pressure acting against the piston 26*b*1 in the first chamber 26*b*3 will overcome the force of the spring 26*b*6, thereby opening the backflow valve 26 to dump the excess air in the plenum 24 overboard. This corresponds to stage 4 in FIG. 4. During this stage, the pressure in the plenum is maintained substantially constant. Then, when the one or more bleed off valves 22 close, the remaining compressor bleed air in the plenum 24 will flow out of the plenum 24 via the backflow valve 26 until the pressure in the plenum 24 falls under the pressure threshold (Pr) at which time the force of the spring 26*b*6 will displace the closure 26*a* of the backflow valve 26 back to its closed position.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology.

The invention claimed is:

1. A system for bleeding air from a compressor of an aircraft engine, the system comprising:
   a bleed off valve fluidly connected to the compressor;
   a plenum downstream of the bleed off valve for receiving bleed air from the compressor via the bleed off valve, the plenum having a first outlet for discharging the bleed air from the plenum into the atmosphere, and a second outlet fluidly connected to the compressor at a location upstream from the bleed off valve relative to a flow of air through the compressor the second outlet in fluid flow communication with piccolo holes define in one or more hollow inlet vanes of the compressor; and
   a backflow valve having a closure for selectively closing the first outlet of the plenum, and an actuator operable to displace the closure from a closed position to an open position upon a fluid pressure inside the plenum reaching a pressure threshold, wherein the backflow valve has a larger flow area than a total flow area of the piccolo holes.

2. The system of claim 1, wherein the actuator is a fluid driven actuator operatively connected to a source of fluid pressure of the aircraft engine.

3. The system of claim 2, wherein the source of fluid pressure is the bleed air inside the plenum.

4. The system of claim 2, wherein the fluid driven actuator comprises a piston mounted for reciprocal movement inside a piston housing, the piston dividing the piston housing into a first chamber and a second chamber, the first chamber fluidly connected to the source of fluid pressure, and a biasing member mounted inside the second chamber for biasing the piston towards a first position in which the closure assumes its closed position.

5. The system of claim 4, wherein the actuator further comprises a piston rod extending from the piston axially through the first chamber, the piston rod mechanically connected to the closure for causing movement of the closure between its open and closed positions, and wherein the biasing member comprises a spring held captive inside the second chamber against the piston.

6. The system of claim 1, wherein the closure includes a metering plate movable in a plane normal to an axis of the first outlet of the plenum.

7. The system of claim 6, wherein the metering plate is pivotable about a pivot axis parallel to and offset from the axis of the first outlet of the plenum.

8. The system of claim 7, wherein the metering plate is mechanically connected to the actuator via a linkage, the linkage connected to the metering plate at a location spaced from the pivot axis.

9. An aircraft engine comprising:

a compressor section fluidly connected to an air intake including a plurality of inlet struts, one or more of the inlet struts having piccolo holes; and a compressor bleed air system including:

one or more bleed off valves for bleeding air from the compressor section;

a plenum in fluid communication with the one or more bleed off valves for receiving compressor bleed air from the one or more bleed off valves, the plenum having a first outlet fluidly connected to the atmosphere and a second outlet fluidly connected to the piccolo holes for reinjecting a portion of the compressor bleed air received in the plenum into the air intake; and a backflow valve at the first outlet, the backflow valve including a closure displaceable between a closed position in which the first outlet of the plenum is closed and an open position in which the first outlet is opened, and an actuator configured to displace the closure from the closed position to the open position when the piccolo holes are choked;

wherein the actuator is a fluid driven actuator fluidly connected to a source of compressor bleed air and wherein a flow area of the piccolo holes is smaller than that of the backflow valve.

10. The aircraft engine of claim 9, wherein the actuator is responsive to an increase of fluid pressure inside the plenum beyond a predetermined pressure threshold.

11. The aircraft engine of claim 10, wherein the actuator is a fluid driven actuator having a control port fluidly connected to the plenum.

12. The aircraft engine of claim 11, wherein the fluid driven actuator includes a spring-loaded piston having a spring force tuned to maintain the closure in its closed position until a pressure inside the plenum reaches the predetermined pressure threshold.

13. The aircraft engine of claim 12, wherein the spring-loaded piston is connected to the closure via a linkage.

14. The aircraft engine of claim 13, wherein the closure includes a metering plate mounted for pivotal movement in a plane normal to an axis of the first outlet of the plenum.

15. The aircraft engine of claim 14, wherein the metering plate has a pivot axis located outside of a boundary of the first outlet.

16. The aircraft engine of claim 13, wherein the closure includes a pair of coplanar plates linearly moveable relative to one another between a first position in which respective airflow passages in the coplanar plates are aligned and a second position in which their respective air flow passages are offset.

17. An aircraft engine comprising:

a compressor section fluidly connected to an air intake including a plurality of inlet struts, one or more of the inlet struts having piccolo holes; and a compressor bleed air system including:

one or more bleed off valves for bleeding air from the compressor section;

a plenum in fluid communication with the one or more bleed off valves for receiving compressor bleed air from the one or more bleed off valves, the plenum having a first outlet fluidly connected to the atmosphere and a second outlet fluidly connected to the piccolo holes for reinjecting a portion of the compressor bleed air received in the plenum into the air intake; and a backflow valve at the first outlet, the backflow valve including a closure displaceable between a closed position in which the first outlet of the plenum is closed and an open position in which the first outlet is opened, and a fluid driven actuator configured to displace the closure from the closed position to the open position when the piccolo holes are choked, the fluid driven actuator having a control port fluidly connected to the plenum, the fluid driven actuator responsive to an increase of fluid pressure inside the plenum beyond a predetermined pressure threshold, the fluid driven actuator including a spring-loaded piston having a spring force tuned to maintain the closure in its closed position until a pressure inside the plenum reaches the predetermined pressure threshold, and wherein the spring-loaded piston is connected to the closure via a linkage.

18. A system for bleeding air from a compressor of an aircraft engine, the system comprising:

a bleed off valve fluidly connected to the compressor;

a plenum downstream of the bleed off valve for receiving bleed air from the compressor via the bleed off valve, the plenum having a first outlet for discharging the bleed air from the plenum into the atmosphere, and a second outlet fluidly connected to the compressor at a location upstream from the bleed off valve relative to a flow of air through the compressor; and a backflow valve having a closure for selectively closing the first outlet of the plenum, and an actuator operable to displace the closure from a closed position to an open position upon a fluid pressure inside the plenum reaching a pressure threshold, the closure including a metering plate movable in a plane normal to an axis of the first outlet of the plenum, the metering plate pivotable about a pivot axis parallel to and offset from the axis of the first outlet of the plenum.

\* \* \* \* \*